Figure 1:
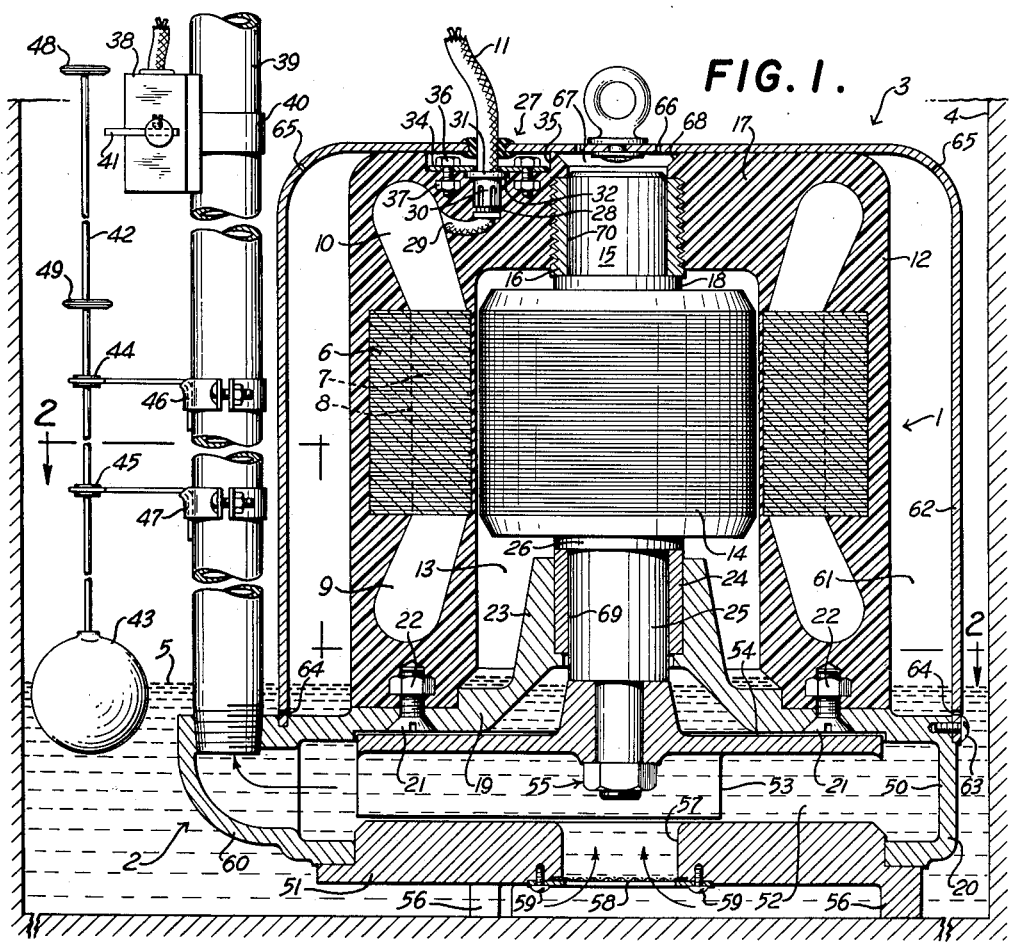

July 3, 1962

J. T. MAYNARD 3,041,976

MOTOR PUMP CONSTRUCTION

Filed July 2, 1958

INVENTOR.
JOHN T. MAYNARD
BY
Andrus & Starke
Attorneys

United States Patent Office

3,041,976
Patented July 3, 1962

3,041,976
MOTOR PUMP CONSTRUCTION
John T. Maynard, West Allis, Wis., assignor to A. O. Smith Corporation, Milwaukee, Wis., a corporation of New York
Filed July 2, 1958, Ser. No. 746,274
3 Claims. (Cl. 103—87)

This invention relates to a motor-pump construction and particularly to a sump pump construction or the like wherein the motor in intermittently operated to discharge a fluid within which the motor-pump is submerged.

In certain geographical areas, a sump pump is employed in homes and the like to intermittently discharge water which seeps into the basement. A small depression or sump is formed in the floor of the basement to collect the incoming water and the sump pump is disposed therein. When the water level rises to a predetermined level, the sump pump is automatically started and continues to operate due to a differential switch or the like until the water within the sump is completely discharged.

Submersible sump pumps have a motor and pump completely disposed within the sump and actually enveloped by the rising water. Consequently, as the water level in the sump decreases, the motor-pump assembly operates wholly or partly in air. The heat dissipation from the motor is relatively low in air and the motor tends to overheat, particularly during periods of rapid water seepage and resultant closely spaced operating cycles.

Presently, motors include safety devices which prevent destruction of the motor. However, when the safety devices operate, the pump no longer discharges water and serious damage may result from flooding of water in the basement or the like.

The present invention provides an improved cooling construction including a water cooling jacket mounted in heat dissipating relation to the motor. Means are provided to maintain a fresh supply of water within the cooling jacket during substantially each complete cycle of motor operation. Consequently, the motor never operates in air for an appreciable period.

In accordance with the present invention, a complete or partial cooling chamber is disposed about the pump motor. Small water inlets are provided adjacent the lower portion of the enclosure and air release openings are provided adjacent the upper end of the enclosure. As the water rises in the sump and about the motor-pump assembly, the water also slowly enters into the cooling chamber. When the motor-pump is energized to discharge the surrounding or enveloping water, it rapidly discharges the water in the sump. The water in the cooling chamber is substantially trapped therein and discharges much more slowly because of the small water inlets through which the trapped water drains. Consequently, the motor is maintained in a water cooling jacket until all of the water is discharged from the sump and the motor stops.

As the water level in the sump again increases, fresh cool water enters the cooling chamber and is trapped within the complete or partial enclosure to maintain cooling during a subsequent pumping cycle.

In accordance with another aspect of the invention, the motor stator is encapsulated within a plastic which then constitutes the frame of the motor and hermetically encloses the stator winding from the pumped fluid. Sand, talc and other suitable fillers may be mixed with the plastic to establish rapid dissipation of the heat generated in the stator winding and to reduce curing and thermal stresses.

The present invention provides a water-cooled sump pump having a water jacket refilled with the cooling medium before each cycle of operation.

The drawing furnished herewith illustrates the best mode presently contemplated for carrying out the invention.

Figure 2:
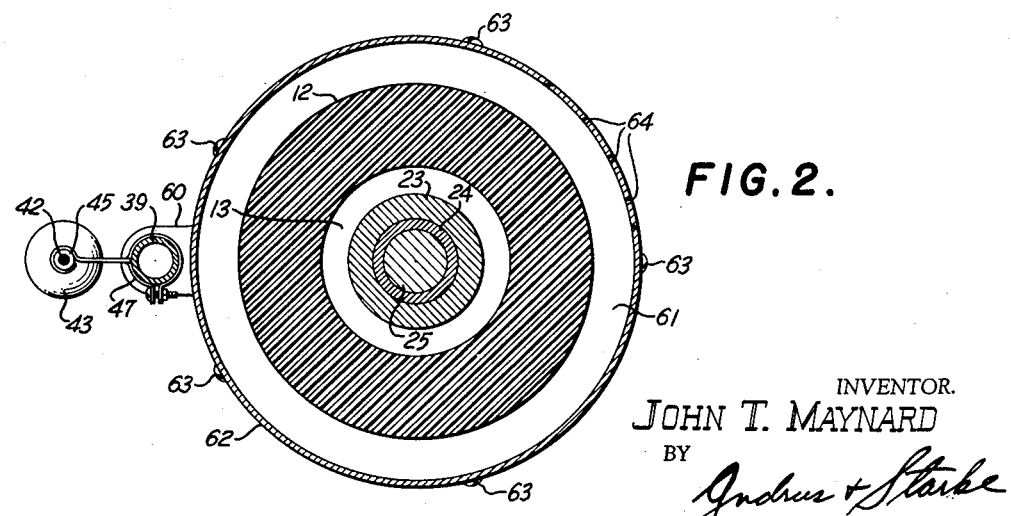

Referring to the drawing:

FIGURE 1 is an elevational view of a sump pump disposed within a sump with parts broken away to more clearly show the present invention; and FIG. 2 is a reduced view taken on the broken line 2—2 of FIGURE 1.

Referring to the drawing and particularly to FIGURE 1 thereof, an electric motor 1 is mounted upon a pump 2 to form an integral motor-pump assembly. The motor-pump assembly is disposed within a sump 3 provided in the floor 4 of a basement or similar structure. As water 5 leaks into the basement of the structure it is collected in the sump 3 and periodically pumped therefrom.

Although any suitable electric motor 1 may be employed to drive the pump 2 in accordance with the broadest aspect of the present invention, a particularly satisfactory and novel motor construction is disclosed and described as follows:

The motor 1 includes a conventional laminated stator core 6 having a field winding 7 wound in suitable slots 8 and extending axially therefrom as at 9 and 10. A suitable incoming power cable 11 is connected to the upper end or extension 10 of the winding 7 to selectively energize the windings.

The stator core 6 and winding 7 is completely encapsulated within an inverted cup-shaped plastic frame 12 formed of a suitable resinous material. Epoxy resins have a very high rate of heat transfer characteristic and are theoretically therefore exceptionally desirable. However, polyester resins are substantially less expensive than epoxy resins and have a relatively good heat transfer as well as being impervious to water and the like, and therefore are preferred for commercial practice.

The plastic frame 12 is relatively thin adjacent the outer surfaces of the laminated stator core 6 and is relatively heavy adjacent the extended windings 9 and 10 and the ends or faces of the stator core 6.

The stator frame 12 forms a rotor chamber 13 adapted to receive a rotor 14. The rotor 14 is mounted upon a rotor shaft having the upper end 15 journalled in an upper shaft bearing 16 of a combined radial and thrust construction. The bearing 16 is integrally cast centrally within the base 17 of frame 12. A thrust disc 18 is rigidly secured about the upper shaft end 15 and engages the inner end of bearing 16 to transmit axial thrust to the frame 12.

The lower end of the motor frame 12 is substantially closed by the upper wall 19 of casing 20 of the pump 2. A plurality of bolts 21 extend through wall 19 and thread into correspondingly threaded hex nuts 22 which are embedded in the depending edge portion of the frame 12.

A lower bearing hub 23 is integrally formed with the central portion of the pump wall 19 and extends inwardly into the rotor chamber 13. A lower shaft bearing 24 is secured within the hub 23 and radially supports the lower portion 25 of the rotor shaft. A thrust disc 26 is rigidly attached on the lower shaft portion 25 immediately adjacent the rotor 14 and rests on the upper portion of the bearing 24 to transmit the thrust forces established on the rotor during a pumping cycle to the pump casing 20.

Consequently, energization of winding 7 causes the rotor 14 to rotate within the bearings 16 and 24.

The energizing cable 11 passes through a suitable sealing power plug assembly 27 which is secured within the upper portion of the frame 12. The illustrated assembly 27 is generally similar in construction to that shown on applicant's copending application entitled "Method of Forming a Power Lead Connection for Plastic Potted Stator Windings," Serial No. 681,596 and filed on September 3, 1957, now U.S. Patent No. 2,944,297. Generally, the plug assembly 27 includes three prongs 28 which have one end cast into the plastic base 17 of frame 12 and connected by suitable lead 29 to the winding 7. The prongs 28 are cast within the base of a cylindrical recess which is adapted to receive a female receptacle 30 which is secured to the end of power cable 11 and has three contact openings arranged in correspondence with the prongs 28. The collar 31 is integrally formed with the outer insulation of the cable 11 and is adapted to fit into a lesser-depth countersink 32 adjacent the recess. A ring plate 34 overlies the collar 31 within an enlarged, aligned countersink 35 and is adapted to be rigidly clamped to the upper surface of the frame base 17. A plurality of bolts 36 pass through plate 34 and thread into suitably spaced and arranged hex nuts 37 which are embedded within the plastic base. When the bolts 36 are drawn up, the plate 34 is tightly clamped against the upper surface of the plastic frame base 15. The collar 31 flows to completely fill the countersink and hermetically seals the joint adjacent the receptacle 30.

The power cable 11 extends upwardly from the plug assembly 27 to a water level sensitive switch 38 which is adapted to complete and break the circuit from the motor 1 to a suitable source of power, not shown. The switch 38 is attached to a discharge pipe 39 by a suitable bracket 40 at a level above which the water 5 rises.

The switch 38 includes a switch arm 41 which extends radially of the discharge pipe 39 toward a floating actuating arm or rod 42.

A ball-float 43 is secured to the lower end of the float rod 42 and slidably moves the rod within a pair of spaced ring bearing supports 44 and 45 which are secured to the discharge pipe 39 below the level of the switch 38 and in spaced relation to each other by suitable brackets 46 and 47.

A pair of vertically spaced annular switch actuators 48 and 49 are secured encircling the upper portion of the rod 42. When all the water 5 is discharged from the sump 3, the float rod 42 is supported at its lowest position. In this position, the upper switch actuator 48 engages the switch arm 41 and opens the switch 38. As the water 5 rises, the rod or actuating member 42 rises therewith. At a predetermined level, the lower switch actuating lever 49 engages and moves the switch arm 41 to the on-position. The motor 1 is energized and operates the pump 30 to rapidly discharge the water 5 from the sump 3. The rod 42 moves downwardly with the level of the water 5 in the sump 3. When the water is completely discharged, or substantially so, the upper switch actuator 48 again engages the switch arm 41 to again open the switch 38 and stop the operation of the sump pump.

In this manner, water 5 accumulating in the sump 3 is periodically and automatically discharged by the pump 2 in response to the water level in the sump.

The pump 2 includes the upper casing wall 19 which extends laterally of the motor frame 12 and is integrally formed with an annular side wall portion or apron 50. A bottom wall 51 is brazed or otherwise hermetically sealed to the lower end of the side wall 50 to form a pump chamber 52 within which a suitable pump impeller 53 is supported on the end of the lower rotor shaft portion 25. A small running clearance 54 exists between the impeller 53 and the inner surface of the upper casing wall 19.

The impeller 53 is tightly clamped to the lower end of the shaft by a reduced diameter threaded shank and nut assembly 55 for simultaneous rotation with the shaft.

The bottom pump casing wall 51 is provided with a plurality of vertically extending legs 56 which support the motor and pump unit in spaced relation to the floor of sump 3. A central opening 57 is provided in the bottom wall 45 to allow entrance of the water 5 from the sump 3 to the pump chamber 52. A small screen 58 is secured over the opening 57 by a plurality of small screws 59 to block relatively large foreign matter from entering into the pump chamber 52 and interfering with the operation of the pump impeller 53.

An elbow shaped pump outlet 60 is integrally cast with the side wall 50 of the pump casing 20 and is threaded to receive the lower end of the discharge pipe 39 to join the latter to the pump chamber.

When the motor is energized and drives the rotor 14, the pump impeller 53 rotates in synchronism therewith. The rotation of the pump impeller 53 within the chamber 52 draws the water 5 through the lower inlet 57 and discharges it outwardly through pump outlet 60 and the discharge pipe 39.

The sump pump operates under the control of the switch 38 to prevent the water from rising above a predetermined level.

During periods when there is a substantial leakage of water 5 into the sump 3, only relatively short periods of time exist between pumping cycles. Consequently, the motor 1 has a tendency to overheat and unless otherwise protected may destroy itself. Generally, suitable overheating safety devices are provided to prevent destruction of the motor.

In accordance with the present invention, a water cooling jacket chamber 61 is provided immediately adjacent the motor 1 to reduce the temperature of the motor by rapidly dissipating the heat generated by the operation of the motor.

In accordance with the illustrated embodiment of the invention, a generally cup-shaped outer shell 62 formed of sheet metal or other suitable material, is disposed over the motor 1 with the base of the shell resting on the upper surface of the plastic frame 12. The outer diameter of the shell 62 is somewhat greater than the outer diameter of the frame 12 and the lower end of the shell 62 extends downwardly over the side wall 50 of the pump casing 20. A plurality of setscrews 63 pass through the lower portion of shell 62 and thread into suitably provided tapped openings in the wall of casing 20.

The space between the shell 62 and the frame 12 establishes the annular water cooling chamber 61 which completely encircles the motor frame 12.

A plurality of small openings 64, shown substantially enlarged, are provided in the shell 62 immediately adjacent the upper surface of the pump wall 19 to allow the seepage water to enter into the annular cooling chamber 61 incident to accumulation of the water 5 within the sump 3.

Small release vents or openings 65 are provided in the upper end of the shell 62 to allow air within the chamber 61 to escape as the water 5 rises within the chamber 61.

The rate at which the sump 3 fills with water 5 is normally relatively slow compared to the rate of discharge even during periods of great seepage and consequently the cooling chamber 61 is filled substantially coincident with the rising level of the water 5 in the sump 3.

However, during a discharge period, the flow of water 5 from the sump 3 is greatly increased and the water level in the sump 3 decreases much faster than the water within the cooling chamber 61 can drain out through the inlets 64. Consequently, a water cooled jacket is maintained about the motor 1 practically during the entire cycle of motor operation.

In the illustrated embodiment of the invention, the motor bearings 16 and 24 are water lubricated in the following manner.

The shell 62 overlying the upper bearing of the motor 1 is provided with a plurality of small air release vents 66. A small filter pad 67 of felt or the like is secured over the openings within a countersink 68 which is provided in the upper portion of the frame 12 overlying the shaft 15 and the bearing 16.

As the water level rises in the sump 3, it enters the pump chamber 52 including the running clearance 54 between the pump impeller 53 and the upper pump casing wall 19. The water rises upwardly into the rotor chamber 13 through the running clearance 69 between the lower bearing 24 and the lower shaft portion 25 and into the rotor chamber 13. The air within the rotor chamber 13 passes outwardly through the running clearance 70 between the upper bearing 16 and the upper shaft portion 15 and the vent holes 66 provided in the portion of shell 62 which covers the upper shaft end. Consequently, the rotor bearings 16 and 24 are lubricated by the water leaking into the rotor chamber 13.

The running clearances 69 and 70 are normally about .002 or .003 inch. The water can enter into the rotor chamber 13 through such a clearance as rapidly as the water rises in the sump 3 under normal conditions to establish the water lubrication of bearings 16 and 24.

In certain applications, however, the water may rise in the sump faster than it can rise within the rotor chamber 13. When the water rises above the shell 62 and covers the vent holes 66, a certain amount of air is trapped within the rotor chamber 13. However, when the motor begins to operate the impeller 53 establishes a relatively high pressure in the pump chamber 52 which is transmitted through the impeller running clearance 54 to the lower end of the running clearance 69. The rotor chamber 13 is at a relatively low pressure and water is rapidly pumped into the rotor chamber and the air forced outwardly through the upper running clearance 70 and the vent holes 66.

To positively establish adequate flow of water through the motor, suitable channels may be provided in the bearings. Further, the clearance 54 between the pump impeller 53 and wall 19 can be varied to adjust the leakage rate into the rotor chamber to insure adequate lubrication and cooling.

The operation of the apparatus is summarized as follows: As the level of water 5 rises, water enters in the cooling chamber 61 through the water inlets 64, the air escaping through vents 65.

The float rod 42 moves up and down in response to the changes in the level of the water 5 in the sump 3. When the water level reaches a predetermined level, the rod 42 causes switch actuator 49 to engage switch arm 41 and close the switch 38.

At this time, the water in the sump 3 completely envelopes the sump pump assembly and the water chamber 61 is completely filled with water.

The pump motor 1 is energized and operates to drive the impeller 53 which draws the water 5 from the sump 3 through the inlet opening 57. The water 5 is forced outwardly through the outlet 60 into the discharge pipe 39 from where it is directed to a suitable disposal location, not shown.

The rate of discharge flow established by the pump 2 is relatively great. Consequently, the water level recedes within the sump 3 and about the sump pump assembly much faster than the rate at which the water within the annular chamber 61 can leak out through the small inlet openings 64. Although a small amount of the water within the chamber 61 is discharged as the water level recedes below the level of the sump pump assembly, the amount is such a small amount as to be practically inconsequential. The sump motor 1 is therefore maintained within an essentially completely water filled cooling chamber or jacket 61 for the entire pumping cycle.

When the water level drops to a predetermined lower level, the float rod 42 drops to engage the upper actuator 48 and switch arm 41 and causes the latter to open the switch 33. The motor 1 is then de-energized and pump 2 is no longer driven.

The water within the cooling chamber 61 is then discharged into the sump 3 through the small openings 64. The level of the water 5 in sump 3 begins to rise and the float rod 42 is again carried upwardly.

Subsequently, as the water 5 in the sump 3 again rises, the level of the water in the annular chamber 61 also rises. The water within the chamber 61 is then the recently received seepage water which is normally of a much cooler temperature than the water which has been allowed to drain from the chamber 61. Therefore, the cooling water in the chamber 61 is cylically replaced with low temperature water in synchronism with the pumping cycles to provide maximum cooling.

Further, the illustrated motor construction which employs a completely encapsulated stator assembly in a suitable plastic resin establishes maximum transfer of heat from the stator to the water in the cooling chamber 61. Therefore, the motor will run at a relatively cool temperature and overheating is not a serious problem in the present motor construction.

Although a completely enclosing water jacket is illustrated, any suitable partial enclosure may be provided with consequent proportionate cooling of the motor. The complete enclosure obviously establishes maximum cooling and therefore is preferred.

The present invention provides a submersible motor-pump assembly which may be operated with only relatively short periods between pumping operations without overheating of the unit. The cooling apparatus is simple and reliable and does not appreciably increase the cost of the assembly.

Various modes of carrying out the invention are contemplated within the scope of the following claims particularly pointing out and distinctly claiming the subject matter which is regarded as the invention.

I claim:

1. In a sump pump having an electric drive motor to periodically pump a fluid from a collecting chamber, a thin shell encircling said motor and secured at spaced locations to establish a cooling chamber disposed in heat exchange relation to said motor, and water passage openings adjacent the lower portion of the cooling chamber to admit fluid thereto as fluid rises in the collecting chamber, the fluid in the cooling chamber slowly discharging through said water passage openings incident to a pumping operation and thereby cooling the motor during the pumping operation.

2. In a sump pump driven by an electrical motor having an annular stator member, an inverted cup-shaped plastic frame encapsulating said stator member to support the stator member and dissipate the heat generated within the stator winding, a pump assembly secured to the open lower end of the frame, a cooling chamber adjacent the frame, and means to admit fluid to said cooling chamber as the pumped fluid rises and to slowly discharge the fluid in the cooling chamber incident to pumping of the pumped fluid.

3. In a sump pump adapted to be disposed in a sump and driven by an electrical motor having an annular stator member cast within a cup-shaped plastic frame to support the stator member and transmit the heat from the stator winding, a pump assembly secured to the open end of the frame and extending radially therefrom, a thin cup-shaped metal shell having a diameter and depth greater than said frame and being disposed in telescoped relation over said frame and said pump assembly to form a cooling chamber encircling said motor with one wall of the chamber being formed by the plastic frame, inlet openings to admit fluid to said cooling chamber as the fluid rises in the sump, and air release vents in the upper portion of the shell to vent air from the chamber, said fluid being slowly discharged from the cooling chamber as the fluid level in the sump drops incident to pumping of the fluid.

(References on following page)

References Cited in the file of this patent

UNITED STATES PATENTS

| | | |
|---|---|---|
| 1,958,566 | Moran et al. | July 31, 1934 |
| 2,107,481 | Johnson | Feb. 8, 1938 |
| 2,646,001 | Ray | July 21, 1953 |
| 2,669,187 | Guyer | Feb. 16, 1954 |
| 2,782,720 | Dochterman | Feb. 26, 1957 |
| 2,803,384 | Korte et al. | Aug. 20, 1957 |
| 2,810,348 | White | Oct. 22, 1957 |
| 2,816,506 | Tweedy | Dec. 17, 1957 |